United States Patent
Sunaga

(10) Patent No.: US 7,999,444 B2
(45) Date of Patent: Aug. 16, 2011

(54) TIDAL POWER GENERATOR

(76) Inventor: Hideo Sunaga, Ashikaga (JP)

( * ) Notice: Subject to any disclaimer, the term of this patent is extended or adjusted under 35 U.S.C. 154(b) by 234 days.

(21) Appl. No.: 12/444,807

(22) PCT Filed: Nov. 9, 2007

(86) PCT No.: PCT/JP2007/072241
§ 371 (c)(1),
(2), (4) Date: Apr. 8, 2009

(87) PCT Pub. No.: WO2008/059942
PCT Pub. Date: May 22, 2008

(65) Prior Publication Data
US 2010/0109482 A1   May 6, 2010

(30) Foreign Application Priority Data

Nov. 15, 2006  (JP) ................. 2006-309742

(51) Int. Cl.
*H02N 2/18* (2006.01)
(52) U.S. Cl. .............. 310/339; 290/42; 290/53; 290/1 R
(58) Field of Classification Search ............ 310/339, 310/328; 290/42, 53, 1 R
See application file for complete search history.

(56) References Cited

U.S. PATENT DOCUMENTS

| | | | | |
|---|---|---|---|---|
| 4,404,490 A | * | 9/1983 | Taylor et al. | 310/339 |
| 4,685,296 A | * | 8/1987 | Burns | 60/497 |
| 5,552,657 A | * | 9/1996 | Epstein et al. | 310/339 |
| 5,578,889 A | * | 11/1996 | Epstein | 310/339 |
| 5,814,921 A | | 9/1998 | Carroll | |
| 6,198,205 B1 | * | 3/2001 | Oberlin et al. | 310/339 |
| 6,700,217 B1 | * | 3/2004 | North et al. | 290/53 |
| 7,538,445 B2 | * | 5/2009 | Kornbluh et al. | 290/53 |
| 7,649,276 B2 | * | 1/2010 | Kornbluh et al. | 290/53 |

FOREIGN PATENT DOCUMENTS

| | | |
|---|---|---|
| FR | 2460561 A | 7/1979 |
| JP | 60-67782 A | 4/1985 |
| JP | 10-103215 A | 4/1998 |
| JP | 2005-354765 A | 12/2005 |
| JP | 2006-32935 A | 2/2006 |
| WO | WO 85/01324 A1 | 3/1985 |

* cited by examiner

*Primary Examiner* — Walter Benson
*Assistant Examiner* — Bryan Gordon
(74) *Attorney, Agent, or Firm* — Birch, Stewart, Kolasch & Birch, LLP

(57) ABSTRACT

Power generation technology using tidal power or wave power is provided, especially as related to power generation technology using a piezoelectric element. Power generation technology includes a power generation device for effectively generating electric power in water or on a ship with the use of tidal power or wave force and having power generation modules (5a, 5b) having a piezoelectric element (14) put between plates (1a, 1b, 1c). The plates are placed between two flanges (9b, 10) fixed to a rod (3) penetrating the plates. When the rod (3) inclines due to a water flow, the piezoelectric element (14) is compressed by the two flanges (9b, 10) which generates electric power. Moreover, when the rod (3) is restored from due to reduction of the water flow, thickness of the piezoelectric element (14) is restored which also generates electric power.

20 Claims, 4 Drawing Sheets

[Figure 1]
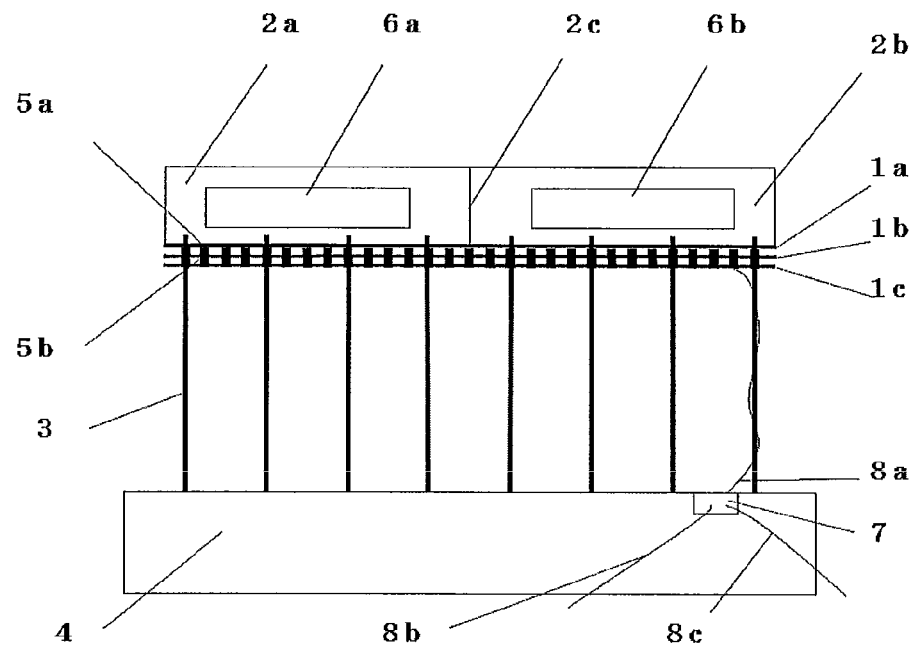
[Figure 2]
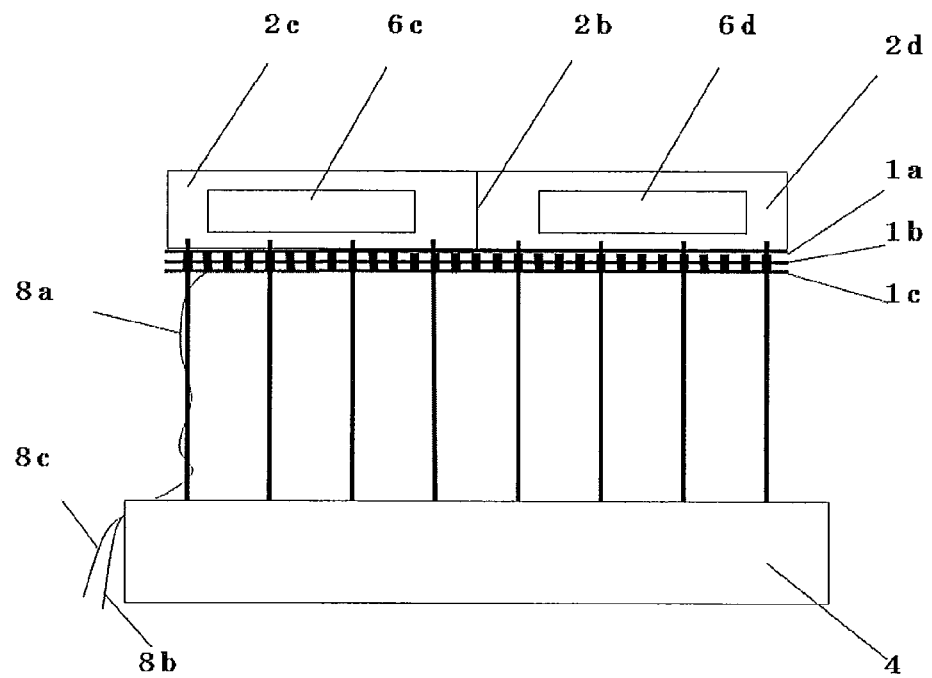

[Figure 3]
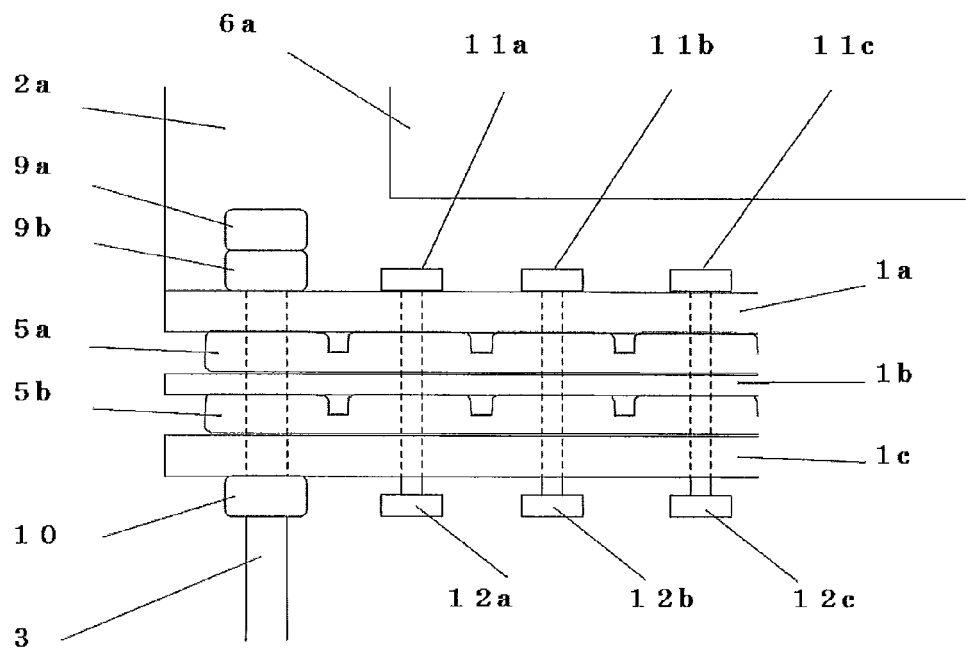
[Figure 4]
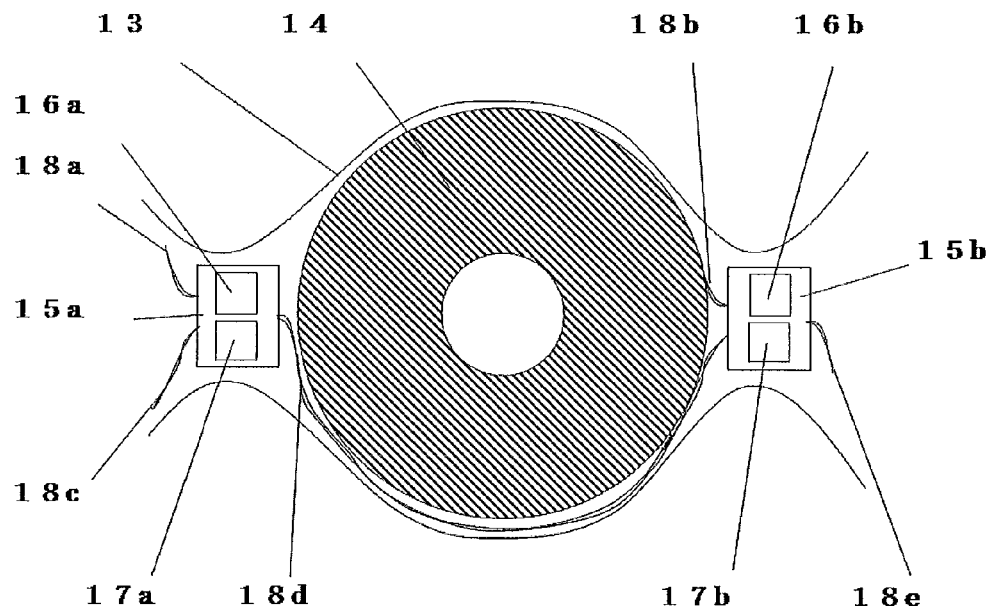

[Figure 5]
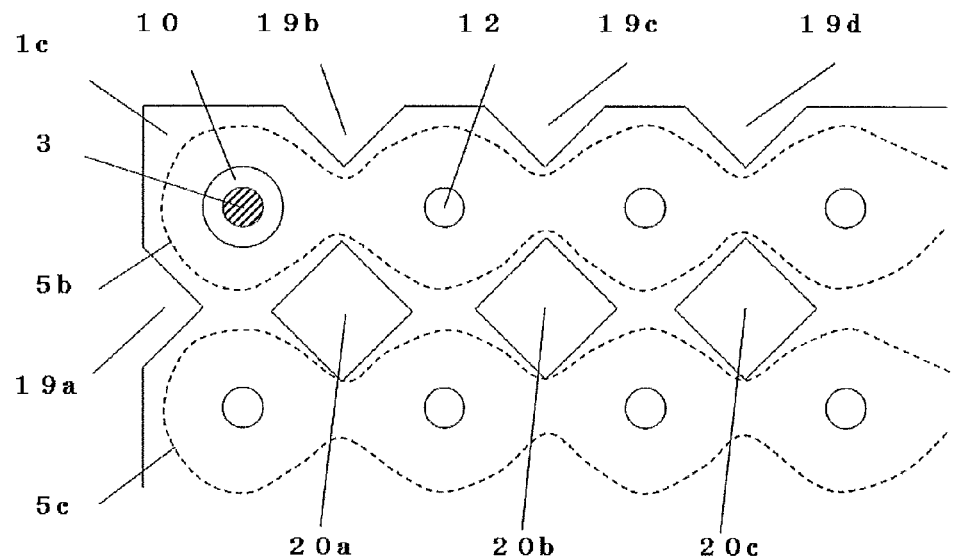
[Figure 6]
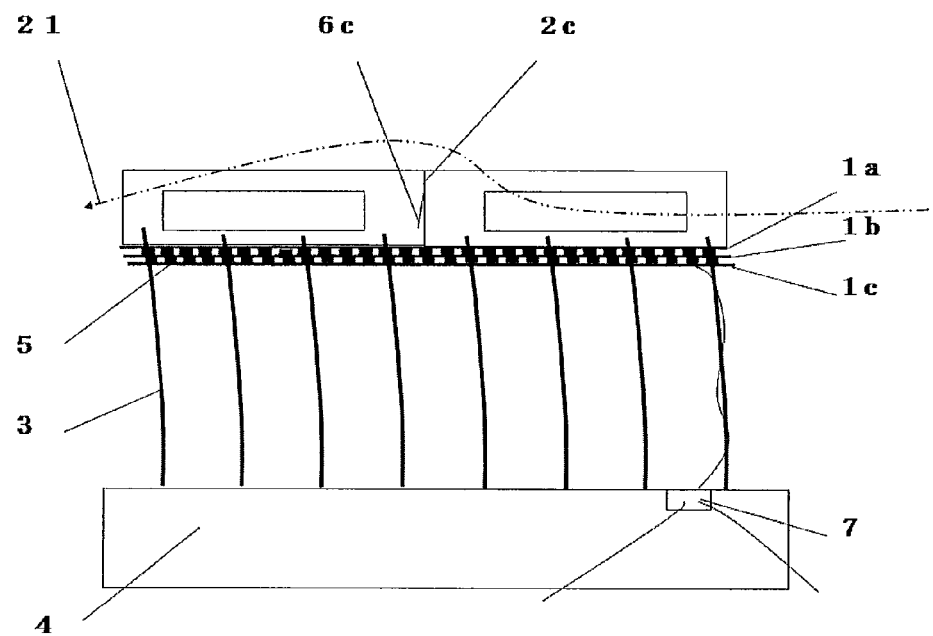

[Figure 7]
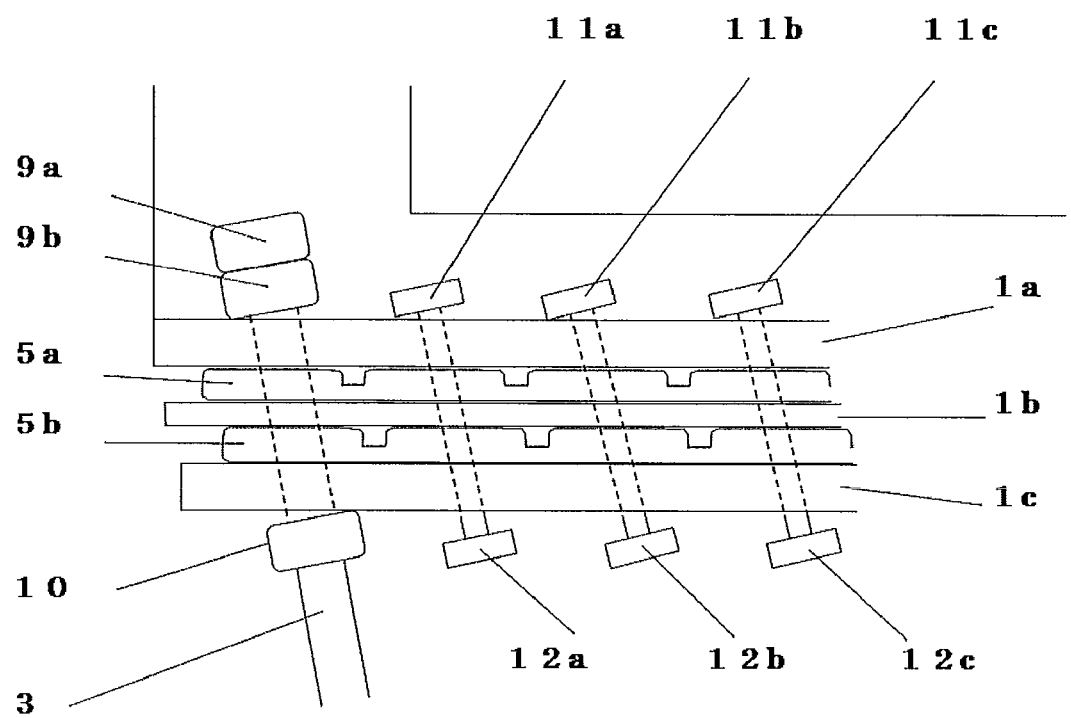

TIDAL POWER GENERATOR

TECHNICAL FIELD

The present invention relates to a power generation technology using tidal power or wave power, especially relates to a power generation technology using a piezoelectric element.

BACKGROUND ART

There is a prior art for producing an electric power from wave power wherein the art comprises a first structure fixed or moored to the bottom of the water, a second structure capable of moving with a wave and making a relative motion to the first structure, and putting a piezoelectric film between the first structure and the second structure for generating an electric power by the tension and slack, and thereby converting the relative motion of the first structure and the second structure into the electric power. (Japanese patent No. 3377590)

DISCLOSURE OF THE INVENTION

Problems to be Resolved by the Invention

The prior art is characterized in that the second structure is exposed to the surface of the sea, and the wave power added on the structure is converted into an electric power. Therefore, the application place of an invention according to the prior art is limited to a structure of the surface of the sea or a breakwater.

Means of Solving the Problems

A power generator is structured by plates having holes, rods having a structure capable of penetrating these plates through the holes and placing these plates between two flanges fixed to a rod, piezoelectric elements put between these plates, rectification circuits connected to these piezoelectric elements and capable of rectifying the output current generated by these piezoelectric elements, condensers connected to these rectification circuits and capable of accumulating the output current of these rectification circuits, fins set up on these plates, and a foundation for fixing one end of these rods at a side to which these plates are not connected.

Effect of Invention

In general, it is thought that a change of a hydraulic pressure in the sea is always generated by the vibration caused by the wave of the surface of the sea, the tide, a flow of the ocean, and the river's flowing, and thereby being caused some irregular water current flow at a short cycle. Especially, in the vicinity of the bottom of the sea, it is thought that these irregular water current flows are approximately in parallel to the bottom surface of the sea.

By setting up the present invention in the sea and setting some fins of the present invention up perpendicularly on these plates of the present invention, these fins block the irregular water current flow at a short cycle and thereby the fins being forced by the resistance power generated by the irregular water current flow. The resistance power of the irregular water current flow by which these fins in the present invention are forced, is transmitted to the rods through these plates. Because these rods have a moderate elasticity and the one ends of these rods are fixed to the foundation, these rods are bent horizontally by the transmitted power. Although each part of these plates of the present invention moves horizontally depending on the inclination of these bent rods because of loose uniting between these plates and these rods, an interval of each plate in vertical direction is compressed by the restriction of keeping the interval between the flanges on each rod constant. This makes it possible to compress piezoelectric elements put between these plates of the present invention in vertical direction, and thereby generating an electricity by this function. The electricity generated by the compression of these piezoelectric elements of the present invention is rectified to direct current with rectification circuits and is accumulated to condensers. Moreover, when the resistance power caused by the irregular water current flow on these fins of the present invention decreases, the elasticity of these rods and these piezoelectric elements of the present invention makes it possible to restore the bent of these rods, and thereby the interval of each plate of the plates restoring to a previous interval. Although an electric power of the backward voltage generates when the piezoelectric elements are restored to a previous thickness, the electric power obtained thus is rectified to direct current with these rectification circuits of the present invention and is accumulated to these condensers. In this way, the present invention makes it possible to convert the power of an irregular water current flow generated in the sea into the electric power efficiently. Therefore, the present invention also makes it possible to generate the electric power in the sea or at the bottom of the sea without being limited to the surface of the sea or the breakwater.

BRIEF DESCRIPTION OF THE DRAWINGS

FIG. 1 is a front view of the present invention;

FIG. 2 is a right side view of the present invention;

FIG. 3 is an enlarged view at the left end in a front view of the present invention;

FIG. 4 is a sectional view of the power generation module 5b in horizontal direction;

FIG. 5 is a bottom view of the plate 1c of the present invention wherein the rod 3 was horizontally cut;

FIG. 6 is a view which explains the operation of the present invention;

FIG. 7 is an enlarged view at the left end in a front view of the present invention which explains the operation of the present invention;

EXPLANATION OF REFERENCES

| | |
|---|---|
| 1a,1b,1c | plates; |
| 2,2a,2b,2c,2d | fins; |
| 3 | rod; |
| 4 | foundation; |
| 5,5a,5b,5c | power generation modules; |
| 6a,6b,6c,6d | doors; |
| 7 | condenser module; |
| 8a,8b,8c | coaxial cables; |
| 9a,9b | large size nuts; |
| 10 | flange; |
| 11a,11b,11c | small size bolts; |
| 12,12a,12b,12c | small size nuts; |
| 13 | hull of the power generation module; |
| 14 | piezoelectric element; |
| 15a,15b | substrates; |
| 16a,16b | diode bridges; |
| 17a,17b | condensers; |
| 18a,18b,18c,18d,18e | pair cables; |
| 19a,19b,19c,19d | cutting lacks; |
| 20a,20b,20c | outlets; |
| 21 | imagination line of a water current flow; |

BEST MODE FOR CARRYING OUT THE INVENTION

FIG. 1 shows the front view of the present invention. Moreover, FIG. 2 shows the right side view of the present invention. At first, in the present invention, many rods 3 made of titanium alloy with two flanges are fixed to the foundation 4 made of concrete. The plates 1a, 1b and 1c made of aluminum alloy are inserted between two flanges of each rod 3, and the power generation module 5a is inserted between the plates 1a and 1b, and the power generation module 5b is inserted between the plates 1b and 1c. Four fins made of aluminum alloy which are shown in FIG. 1 as 2a and 2b and shown in FIG. 2 as 2c and 2d, are set up radially and vertically at the center of the plate 1a. The doors 6a, 6b, 6c and 6d made of aluminum alloy are installed in each fin of 2a, 2b, 2c, and 2d one by one. The condenser module 7 is mounted on the foundation 4 and is connected with the power generation module 5b by the coaxial cable 8a. In addition, the coaxial cable 8b and 8c are connected with the condenser module 7.

FIG. 3 shows the enlarged view at the left end in the front view of the present invention. In FIG. 3, No. 10 shows the flange of the rod 3, and No. 9a and 9b show the large size nuts that are made of titanium alloy and have the same function as the flange 10 attached to the rod 3, and No. 11a, 11b and 11c show the small size bolts made of titanium alloy, and No. 12a, 12b and 12c show the small size nuts made of titanium alloy. As shown in FIG. 3, the large size nuts 9a and 9b are fastened in close contact with the plate 1a, and the small size nuts 12 such as 12a, 12b and 12c etc., are installed flexibly.

FIG. 4 shows the sectional view of the power generation module 5b in horizontal direction. In FIG. 4, No. 13 shows the hull of the power generation module made of polyethylene, No. 14 shows doughnut type of the piezoelectric element which is laminated and molded with ferroelectric or dielectric elastomer, No. 15a and 15b show the substrates, No. 16a and 16b show the diode bridges, No. 17a and 17b show the condensers, No. 18a, 18b, 18c, 18d and 18e show the pair cables. In FIG. 4, both electrodes of the piezoelectric element 14 and the substrate 15b are connected by the pair cable 18b. The substrate 15a and 15b are connected by the pair cable 18d.

FIG. 5 shows the bottom view of the plate 1c of the present invention wherein the rod 3 was horizontally cut. In FIG. 5, No. 19a, 19b, 19c and 19d show the cutting lacks set up to the plate 1c, No. 20a, 20b and 20c show the outlets of earth and sand that are installed on the plate 1c and prevent from accumulating of earth and sand between the plate 1a, 1b, and 1c.

FIG. 6 explains the operation of the present invention. In FIG. 6, No. 21 shows the imagination line of the irregular water current flow at a short cycle which is caused by influence of the vibration of the wave produced in the surface of the sea, the tide, a current, and the river's flowing and it flows from the right toward the left in FIG. 6. The water current flow 21 collides with the fin 2c of the present invention and meanders greatly. At this time, the fin 2c receives the resistance power of the water current flow 21. The resistance power of the water current flow 21 which is caught by the fin 2c is transmitted to the rod 3 through the plate 1a. Because the rod 3 is made of titanium alloy which has moderate elasticity and its one end is fixed to the foundation, it's bent according to the resistance power which is caught by the fin 2c from the water current flow 21. Therefore, the rod 3 which penetrates the plates 1a, 1b and 1c inclines, and the plates 1a, 1b and 1c move horizontally depending on the inclination of the rod 3. FIG. 7 shows the enlarged view of the left end in the front view of the present invention in the case that it received the resistance power of the water current flow 21. As shown in FIG. 7, the rod 3 of the present invention inclines toward left direction by the resistance power of the water current flow 21. However the plate 1a, 1b and 1c are maintained to the horizontal because the present invention has a number of rods 3. At this time, interval between plate 1a and 1c narrows more than those in the case that the rods 3 stand vertically because it keeps distance between the flange 10 and the large size nut 9b constant. The shortening at the interval between plate 1a and 1c means the compression of the thickness of the power generation modules 5a and 5b, and this compression causes the power generation modules 5a and 5b to generate electricity. If the resistance power of the water current flow added to the present invention decreases, the inclination of the rod 3 restores in vertical direction by the restoration power of the rod 3 and the power generation modules 5a and 5b while, the interval between plate 1a and 1c extends. The thickness of the power generation modules 5a and 5b restores depending on the expansion of the interval between plate 1a and 1c, and the power generation modules 5a and 5b generate electricity by restoring this thickness. Moreover, the function of the small size bolts 11a, 11b and 11c and the small size nuts 12a, 12b and 12c is to fix the power generation modules 5a and 5b to the plates 1a, 1b and 1c loosely, and the one side of the power generation modules 5a and 5b can be fixed to each plate with the use of an adhesive agent instead of these bolts and these nuts as long as it's durability is secured. Each power generation modules 5 such as 5a, 5b, and 5c etc., are composed by connecting a necessary number of the piezoelectric elements 14 in the series to secure an enough voltage of power generation. Each power generation modules 5 such as 5a, 5b, and 5c etc., are connected mutually and in parallel and connected with the coaxial cable 8a. The coaxial cable 8a is connected to the condenser module 7 and further connected to a large capacitor in it. The large capacitor is connected in parallel to two coaxial connectors set up on the case of the condenser module 7. The coaxial cable 8b and 8c are connected with two coaxial connectors set up on the case of the condenser module 7, and the coaxial cable 8b and 8c are connected with the other present inventions, and thereby these making it possible to connect a lot of the present invention in parallel. For instance, the electric power generated thus is supplied to the power conditioner set up on land with the coaxial cable 8c, and is sold in the business electric power system through the substation facility.

The upper part of doors 6a, 6b, 6c and 6d set up in fins 2a, 2b, 2c and 2d are fixed with the rotation axis in which springs are built. Therefore, if the resistance power of the water current flow added to the present invention is small, the doors 6a, 6b, 6c and 6d will close whereas, if the resistance power of the water current flow added to the present invention is large, these doors will open to reduce the resistance power of the water current flow added to the present invention and protect the present invention from destruction by strong resistance power of the water current flow.

Example 1

(1) Length of the rod 3: 1.5 m
(2) Length of a side of the plate 1a, 1b and 1c: 4 m

INDUSTRIAL APPLICABILITY

The present invention makes it possible to generate electricity by setting it up at the bottom of the sea or in the sea depending on an effect of irregular water current flow at a short cycle which is caused in the sea. Moreover, when the present invention is set up on the ship by fixing rods of the present invention to the deck of the ship, the whole of the present invention is shaken by the wave power, and it can also generate electricity on the ship because of the bend of these rods by the inertia force of plates.

The invention claimed is:

1. A power generator comprising:
   at least two plates having holes,
   rods having a structure capable of penetrating through the holes in each of the at least two plates, and placing the at least two plates between two flanges,
   piezoelectric elements put between the at least two plates,
   rectification circuits connected to the piezoelectric elements and capable of rectifying output current generated by the piezoelectric elements, and
   condensers connected to the rectification circuits and capable of accumulating the output current of the rectification circuits,
   wherein an inclination of the rods causes each of the flanges to compress the piezoelectric elements put between the at least two plates.

2. The power generator according to claim 1, wherein at least one fin is mounted on an upper one of the at least two plates.

3. The power generator according to claim 1, wherein the two flanges are a first flange and a second flange provided on each of the rods,
   wherein the first flange presses directly against on a top surface of an upper most one of the at least two plates, and the second flange presses directly on a bottom surface of a lower most one of the at least two plates.

4. The power generator according to claim 1, wherein the piezoelectric elements are connected in series and form a power generation module which is sandwiched directly between two of the at least two plates.

5. The power generator according to claim 3, wherein the piezoelectric elements are connected in series and form a power generation module which is sandwiched directly between two of the at least two plates.

6. The power generator according to claim 5, wherein the power generator is acted upon by a horizontal force of a predetermined strength, the rods are caused to bend from a linear orientation to a curved orientation, which shortens a vertical interval between to the two plates which sandwich the power generation module while maintaining a horizontal orientation of each of the at least two plates.

7. The power generator according to claim 1, wherein each of the at least two plates is formed with notches on peripheral edges thereof, and outlets penetrating from top to bottom thereof to prevent foreign material from collecting between the at least two plates.

8. The power generator according to claim 1, wherein the at least two plates includes three plates arranged one above the other, each of the three plates being separated from the one above by a layer of the piezoelectric elements.

9. The power generator according to claim 1, wherein the piezoelectric elements include first piezoelectric elements connected in series to form a first power generation module, and second piezoelectric elements connected in series to form a second power generation module adjacent to the first power generation module, each of the first and second power generation modules being sandwiched directly between two of the at least two plates.

10. The power generator according to claim 9, wherein each of the at least two plates is formed with outlets penetrating from top to bottom thereof to prevent foreign material from collecting between the at least two plates, the outlets being formed in the plates between the first and second power generation modules.

11. A power generator comprising:
    at least two plates having holes,
    rods having a structure capable of penetrating through the holes in each of the at least two plates, and placing the at least two plates between two flanges,
    piezoelectric elements disposed between the at least two plates,
    rectification circuits connected to the piezoelectric elements and capable of rectifying output current generated by the piezoelectric elements, and
    condensers connected to the rectification circuits and capable of accumulating the output current of the rectification circuits,
    wherein the piezoelectric elements are connected in series to form a power generation module disposed between the at least two plates, and
    where the rods penetrating through the holes in each of the at least two plates also penetrate though holes formed in the power generation module between the at least two plates,
    wherein an inclination of the rods causes each of the flanges to compress the piezoelectric elements put between the at least two plates.

12. The power generator according to claim 11, wherein at least one fin is mounted on an upper one of the at least two plates.

13. The power generator according to claim 11, wherein the two flanges are a first flange and a second flange provided on each of the rods,
    wherein the first flange presses directly against on a top surface of an upper most one of the at least two plates, and the second flange presses directly on a bottom surface of a lower most one of the at least two plates.

14. The power generator according to claim 11, wherein the piezoelectric elements are connected in series and form a power generation module which is sandwiched directly between two of the at least two plates.

15. The power generator according to claim 11, wherein the piezoelectric elements are connected in series and form a power generation module which is sandwiched directly between two of the at least two plates.

16. The power generator according to claim 15, wherein the power generator is acted upon by a horizontal force of a predetermined strength, the rods are caused to bend from a linear orientation to a curved orientation, which shortens a vertical interval between to the two plates which sandwich the power generation module while maintaining a horizontal orientation of each of the at least two plates.

17. The power generator according to claim 11, wherein each of the at least two plates is formed with notches on peripheral edges thereof, and outlets penetrating from top to bottom thereof to prevent foreign material from collecting between the at least two plates.

18. The power generator according to claim 11, wherein the at least two plates includes three plates arranged one above the other, each of the three plates being separated from the one above by a layer of the piezoelectric elements.

19. The power generator according to claim 11, wherein the piezoelectric elements include first piezoelectric elements connected in series to form a first power generation module, and second piezoelectric elements connected in series to form a second power generation module adjacent to the first power generation module, each of the first and second power generation modules being sandwiched directly between two of the at least two plates.

20. The power generator according to claim 19, wherein each of the at least two plates is formed with outlets penetrating from top to bottom thereof to prevent foreign material from collecting between the at least two plates, the outlets being formed in the plates between the first and second power generation modules.

* * * * *